United States Patent
Rymeski et al.

(10) Patent No.: US 8,839,036 B2
(45) Date of Patent: Sep. 16, 2014

(54) SYSTEM AND METHOD FOR ROOT CAUSE ANALYSIS

(75) Inventors: Scott M. Rymeski, West Warwick, RI (US); Tiegeng Ren, Wakefield, RI (US); Michael D. Samson, Sutton, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 214 days.

(21) Appl. No.: 12/982,512

(22) Filed: Dec. 30, 2010

(65) Prior Publication Data

US 2012/0173927 A1 Jul. 5, 2012

(51) Int. Cl.
*G06F 11/00* (2006.01)
*G06F 11/07* (2006.01)

(52) U.S. Cl.
CPC .......... *G06F 11/079* (2013.01); *G06F 11/0709* (2013.01); *G06F 11/0748* (2013.01)
USPC .............................................. 714/26; 714/25

(58) Field of Classification Search
CPC ........................... G06F 11/079; G06F 11/3447
USPC ............................................... 714/25, 26, 37
See application file for complete search history.

(56) References Cited

U.S. PATENT DOCUMENTS

| | | | | |
|---|---|---|---|---|
| 6,374,293 B1 * | 4/2002 | Dev et al. | | 709/220 |
| 6,499,117 B1 * | 12/2002 | Tanaka | | 714/49 |
| 6,925,431 B1 * | 8/2005 | Papaefstathiou | | 703/17 |
| 7,254,747 B2 * | 8/2007 | Osborn et al. | | 714/37 |
| 7,516,362 B2 | 4/2009 | Connelly et al. | | |
| 7,925,389 B2 * | 4/2011 | Bradicich et al. | | 700/299 |
| 8,346,398 B2 * | 1/2013 | Ahmed et al. | | 700/278 |
| 8,612,377 B2 * | 12/2013 | Beg et al. | | 706/52 |
| 2003/0065986 A1 | 4/2003 | Fraenkel et al. | | |
| 2005/0038818 A1 * | 2/2005 | Hooks | | 707/104.1 |
| 2006/0242288 A1 | 10/2006 | Masurkar | | |
| 2009/0103916 A1 * | 4/2009 | Dolan, III | | 398/9 |
| 2009/0149972 A1 * | 6/2009 | Nasle | | 700/80 |
| 2011/0061015 A1 * | 3/2011 | Drees et al. | | 715/771 |
| 2011/0112701 A1 * | 5/2011 | Johnson et al. | | 700/295 |
| 2011/0137853 A1 * | 6/2011 | Mackay | | 706/57 |
| 2012/0022698 A1 * | 1/2012 | Mackay | | 700/275 |
| 2012/0022700 A1 * | 1/2012 | Drees et al. | | 700/276 |
| 2012/0092811 A1 * | 4/2012 | Chapel et al. | | 361/622 |

FOREIGN PATENT DOCUMENTS

| | | |
|---|---|---|
| WO | 03005200 A1 | 1/2003 |
| WO | 2006031635 A2 | 3/2006 |
| WO | 2007140133 A2 | 12/2007 |
| WO | 2009153901 A1 | 12/2009 |

OTHER PUBLICATIONS

International Search Report and Written Opinion for PCT/US2011/067362 dated Mar. 15, 2012.

* cited by examiner

*Primary Examiner* — Michael Maskulinski
(74) *Attorney, Agent, or Firm* — Lando & Anastasi, LLP

(57) ABSTRACT

Systems and methods for determining the root cause of an event in a data center are presented. The system includes a data center management device coupled to a network and configured to receive an indication of the event from a physical infrastructure device via the network, determine a first generic cause model for the event by accessing an event cause model data store, determine a first event profile by adapting the first generic cause model to the data center using data center profile information stored in a data center profile data store and display a first probability that a potential cause defined by the first event profile is the root cause.

16 Claims, 12 Drawing Sheets

SYSTEM AND METHOD FOR ROOT CAUSE ANALYSIS

BACKGROUND

1. Technical Field

The technical field relates generally to analyzing anomalous events within a monitored space and, and more specifically, to apparatus and processes for determining the root cause of one or more anomalous events.

2. Discussion of Related Art

Data center monitoring systems provide for the efficient monitoring of large scale computing environments. Conventional data center monitoring systems include sensors that monitor the operating environment of a data center and, in some case, the operational status of individual pieces of equipment. Under some configurations, these sensors report operational information to a centralized system that analyzes the operational information and generates any warranted alarms. Alarms are customarily reported to personnel charged with maximizing the uptime of data center equipment.

In large data center installations, the amount of information generated by these alarms is sometimes overwhelming. In these instances, isolating of the root cause or causes of the alarms may be difficult. This, in turn, may also increase the difficult of determining appropriate corrective action.

SUMMARY OF THE INVENTION

According to one example, a system for determining a root cause of an event in a data center is provided. The data center includes a plurality of devices. The system includes a data center management device coupled to a network. The data center management device includes a memory and at least one processor coupled to the memory. The data center management device is configured to receive an indication of the event from a physical infrastructure device via the network, determine a first generic cause model for the event by accessing an event cause model data store, determine a first event profile by adapting the first generic cause model to the data center using data center profile information stored in a data center profile data store and display a first probability that a potential cause defined by the first event profile is the root cause.

In the system, the first generic cause model may include an indication of a relationship between the event and provision of a first data center resource. The data center management device may be configured to adapt the first generic cause model to the data center at least in part by identifying a first device coupled to the physical infrastructure device that is involved in provision of the first data center resource. In addition, the first data center resource may include power. Further, the physical infrastructure device may supply the first data center resource to the first device. Moreover, the physical infrastructure device may receive the first data center resource from the first device. Additionally, the first device may be a component of the physical infrastructure device. Furthermore, the data center management device may be further configured to display at least one corrective action. Also, the data center management device may be further configured to initiate the at least one correction action.

In the system, the data center management device may be further configured to determine a second generic cause model for the event by accessing the event cause model data store, the second generic cause model including an indication of a relationship between the event and provision of a second data center resource, determine a second event profile by adapting the second generic cause model to the data center using data center profile information stored in the data center profile data store. The data center management device may be configured to adapt the second cause model to the data center at least in part by identifying a second device coupled to the physical infrastructure device that is involved in provision of the second data resource and display a second probability that another potential cause defined by the second event profile is the root cause. In addition, the first data center resource and the second data center resource may be a same data center resource. Further, the second device may be coupled to the physical infrastructure device via the first device. Moreover, the data center management device may be further configured to display the first probability as a first link between one or more first nodes in a graph, each of the first nodes representing either the physical infrastructure device or another device of the plurality of devices and display the second probability as a second link between one or more second nodes in a graph. Each of the second nodes may represent either the physical infrastructure device or another device of the plurality of devices. Additionally, the data center management device may be further configured to determine that the first probability is greater than the second probability and highlight the one or more first nodes responsive to determining that the first probability is greater than the second probability.

According to another example, a method for determining a root cause of an event in a data center using a data center management device coupled to a network is provided. The data center management device includes memory and at least one processor coupled to the memory. The method includes acts of receiving indication of the event from a physical infrastructure device via the network, determining a first generic cause model for the event by accessing an event cause model data store, determining a first event profile by adapting the first generic cause model to the data center using data center profile information stored in a data center profile data store and displaying a first probability that a potential cause defined by the first event profile is the root cause.

In the method, the first generic cause model may indicate a relationship between the event and provision of a first data center resource and the act of adapting the first generic cause model to the data center may include an act of identifying a first device coupled to the physical infrastructure device that is involved in provision of the first data center resource. In addition, the act of receiving the event may include an act of receiving an event related to the provision of power. The method may further include acts of determining a second generic cause model for the event by accessing the event cause model data store, the second generic cause model indicating a relationship between the event and provision of a second data center resource, determining a second event profile by adapting the second generic cause model to the data center using data center profile information stored in the data center profile data store, wherein adapting the second cause model to the data center includes identifying a second device coupled to the physical infrastructure device that is involved in provision of the second data resource and displaying a second probability that another potential cause defined by the second event profile is the root cause. Also, the method may further include acts of displaying the first probability as a first link between one or more first nodes in a graph, each of the first nodes representing either the physical infrastructure device or another device of a plurality of devices included in the data center and displaying the second probability as a second link between one or more second nodes in a graph, each of the second nodes representing either the physical infrastructure device or another device of the plurality of devices.

According to another example, a non-transitory computer readable medium is provided. The computer readable medium has stored thereon sequences of instruction for determining a root cause of an event in a data center. The instructions that will cause at least one processor to receive an indication of the event from a physical infrastructure device via the network, determine a first generic cause model for the event by accessing an event cause model data store, determine a first event profile by adapting the first generic cause model to the data center using data center profile information stored in a data center profile data store and display a first probability that a potential cause defined by the first event profile is the root cause. In addition, the sequences of instruction may include instructions that will further cause the at least one processor to display the first probability as first link between one or more first nodes in a graph, each of the first nodes representing either the physical infrastructure device or another device of a plurality of devices included in the data center.

Still other aspects, examples, and advantages of these exemplary aspects and examples, are discussed in detail below. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example. The accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF DRAWINGS

Various aspects of at least one example are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
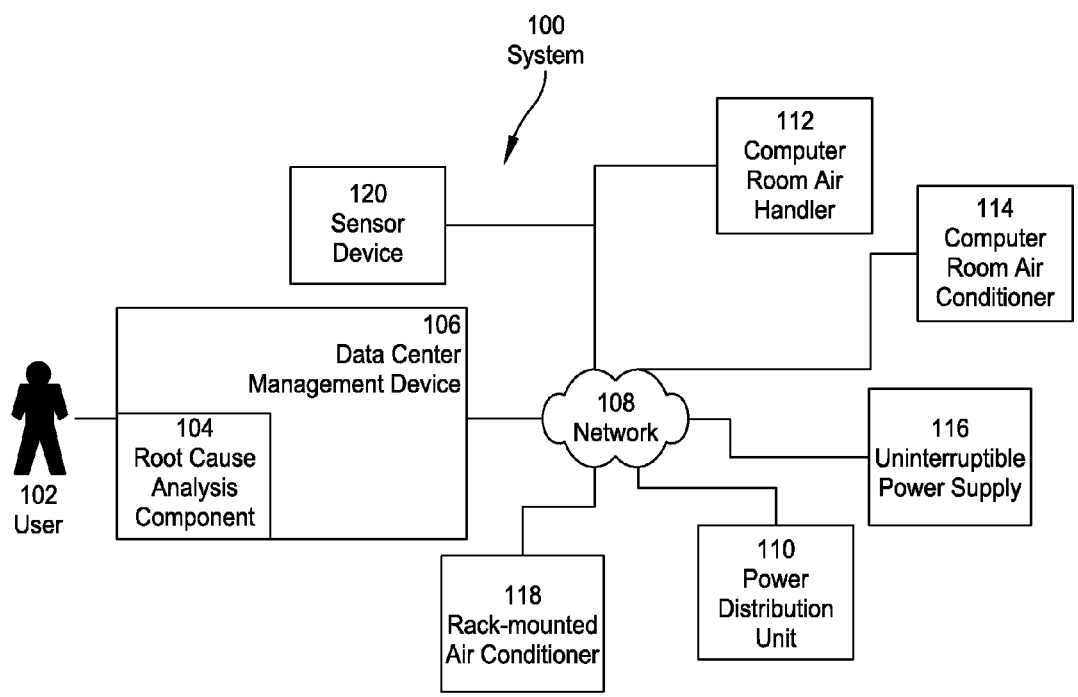
FIG. 1 is a functional schematic of a data center including a data center management device.

Aspects in accord with the present invention manifest an appreciation that conventional data center monitoring systems can produce voluminous information in which events that should be reported in a coordinated fashion are instead reported as disparate events. These aspects, according to various examples, identify potential causes for the reported events and determine a likelihood that each potential cause actually caused the reported events. Moreover, some examples present the reported events and their potential causes with a multiple node graph. These examples provide for more relevant notifications that allow external entities, such as data center technicians, to more efficiently address problems encountered within the data center operating environment.

In addition, aspects and examples relate to apparatus and processes that allow external entities, such as users or systems, to determine one or more root causes for alarms generated during operation of a data center. For instance, in at least one example, a system and method are provided for identifying one or more potential causes for one or more alarms based on information housed within a data center profile and an event cause model. As is discussed further below, exemplary data center profiles include a wide variety of information regarding the physical layout of the data center and the characteristics of the equipment included therein. Also discussed further below, examples of event cause models include information that relates characteristics of events to potential causes for the events.

Examples of the processes and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the apparatus and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatus and methods or their components to any one positional or spatial orientation.

Root Cause Analysis System

Various examples disclosed herein implement root cause analysis components using one or more computer systems. FIG. 1 illustrates one of these examples, a root cause analysis component 104, within the context of a data center management system 100. As shown, the data center management system 100 includes physical and logical elements such as a user 102, a root cause analysis component 104, a data center management device 106, a communications network 108 and a set of physical infrastructure devices. The data center management device 106 is implemented using a computer system, such as the computer systems discussed further below with reference to FIG. 2.

More particularly, a data center management device, such as the data center management device 106, is a specialized computing device engineered to provide data center design, monitoring and configuration services. According to one example, the data center management device 106 is an InfraStruXure® Central Server device available from APC by Schneider Electric. As illustrated, the data center management device 106 may exchange or store information with the physical infrastructure devices and the sensor device 120 via the network 108. This information may include any information required to support the features and functions of the data center management device 106. For example, this information may include event information which is further processed by the data center management device 106 into events and root cause analysis reports.

Examples of physical infrastructure devices, such as those depicted in FIG. 1, include generators, uninterruptible power supplies (UPSs), transformers, power distribution units (PDUs), outlets, computer room air handlers (CRAHs), rack-mounted air conditioners (RMACs), computer room air conditioners (CRACs), environmental sensors, such as temperature, humidity and airflow sensors, and security devices, such as security cameras, door contact sensors and the like. While physical infrastructure devices may include enough computing resources to control the operation of the physical infrastructure device, these computing resources are limited and tailored to support the operation of the physical infrastructure device. In at least one example, these limited computer resources may be disposed upon a Network Management Card (NMC) such as a UPS NMC available from APC by Schneider Electric. The particular physical infrastructure devices shown in FIG. 1 include a PDU 110, a CRAH 112, a CRAC 114, a UPS 116 and a RMAC 118, and a sensor device 120.

Each of the physical infrastructure devices shown in FIG. 1 transmits event information via the network 108 to the data center management device 106. The network 108 may be, among other types of networks, a private network (such as a LAN, WAN, extranet or intranet) or may be a public network (such as the internet). In the example shown, the network 108 is a LAN.

In addition, each of the physical infrastructure devices shown in FIG. 1 consumes, and in some cases provides, data center resources. A data center resource may include, for example, any characteristic of a data center that enables the data center to support the functionality of devices housed therein. Examples of data center resources include power, cooling, physical space, remote equipment control capability, virtualized resources, distributed computing resources, shared data storage, software provisioning, network time synchronization, physical and logical security and physical and logical network connectivity and data transmission.

The event information transmitted via the network 108 may include any information regarding the operations of the physical infrastructure devices or information regarding the operating environment of the physical infrastructure devices. For example, the sensor device 120 may be an environmental sensor that provides information regarding ambient conditions near the sensor device 120, such as a NetBotz® device available from APC by Schneider Electric. In other examples, the sensor 120 may be a contact sensor or security camera. In each of these examples, the data center management device 106 includes components configured to receive the event information and to generate events based on this event information.

In one example, the root cause analysis component 104 is configured to present a root cause analysis interface to an external entity, such as the user 102. The root cause analysis interface provides an interface through which the root cause analysis component receives requests to create, store, modify, delete, view or otherwise manipulate root cause analysis reports. In at least one example, the root cause analysis interface is a browser-based user interface served and rendered by the data center management device 106. In other examples, other suitable user and system interfacing technologies may be used. One example of a root cause analysis interface is discussed further below with reference to FIGS. 3 and 8-12.

Root cause analysis reports generated by the root cause analysis component 104 represent event information, and the physical infrastructure devices referenced therein, via a graph. Within the graph, the root cause analysis component 104 displays nodes representing devices and displays links between one or more of these nodes. These links represent potential causal relationships between the events reported by the devices. For multiple potential causal relationships, the root cause analysis component 104 displays a weighted probability for each potential cause. One example of a root cause analysis component, such as the root cause analysis component 104, is discussed further below with reference to FIG. 3.

To generate root cause analysis reports, the root cause analysis component 104 references both data center profile information and event cause model information. Data center profile information includes information descriptive of the physical layout of the data center and technical specifications of the devices installed within the data center. For example, data center profile information may specify the number of rooms within a data center, the layout of the racks within the rooms and the location of various information technology equipment within (or around) the racks. The event cause model information specifies associations of varying strength between events encountered by physical infrastructure devices and causes for the events. Both data center profile information and event cause model information are discussed further below.

Information, including events, data center profiles and event cause models, may be stored on the data center management device 106 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

In addition, the system structure and content disclosed with regard to FIG. 1 is for exemplary purposes only and is not intended to limit examples to the specific structure shown in FIG. 1. As will be apparent to one of ordinary skill in the art, many variant exemplary system structures can be architected. The particular arrangement presented in FIG. 1 was chosen to promote clarity.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones, personal digital assistants, tablet computers and laptop computers, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects, processes and functions may be implemented within methods, acts, systems, system elements and components using a variety of hardware and software configurations, and examples are not limited to any particular distributed architecture, network, or communication protocol.

Figure 2:
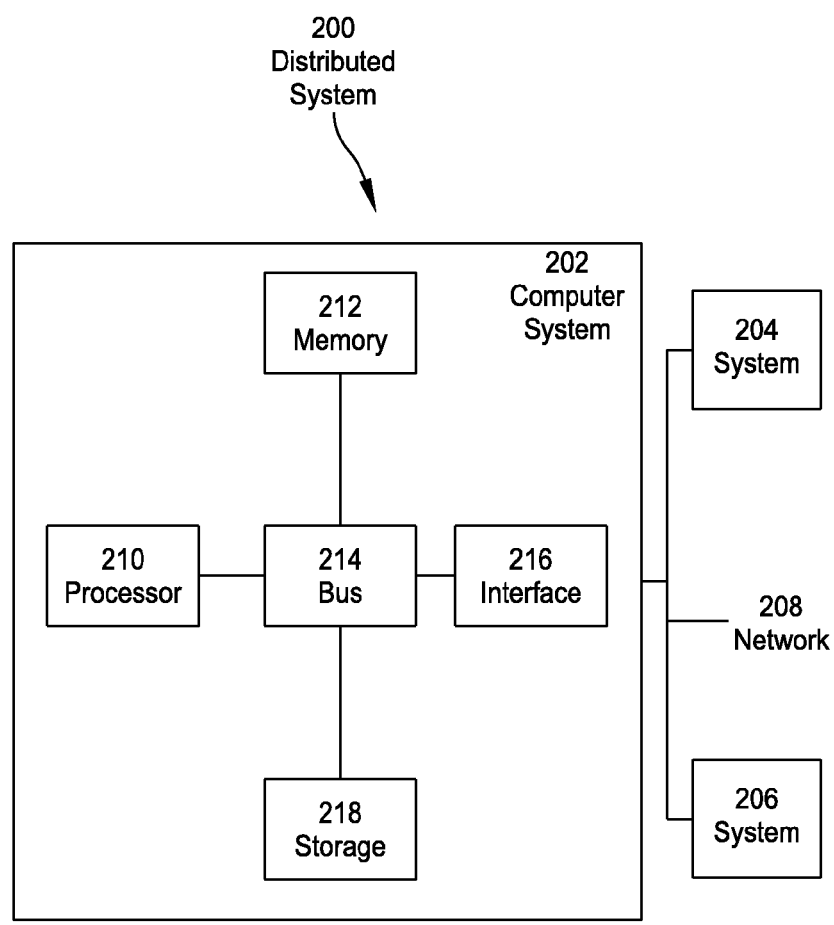
FIG. 2 is a functional schematic of an example computer system in which various aspects, functions and processes disclosed herein may be implemented.

Referring to FIG. 2, there is illustrated a functional schematic of a distributed computer system 200 in which various aspects and functions are practiced. As shown, the distributed computer system 200 includes one more computer systems that exchange information. More specifically, the distributed computer system 200 includes computer systems 202, 204 and 206. As shown, the computer systems 202, 204 and 206 are interconnected by, and may exchange data through, a communication network 208. The network 208 may include any communication network through which computer systems may exchange data. To exchange data using the network 208, the computer systems 202, 204 and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TSL, SSL or VPN. While the distributed computer system 200 illustrates three networked computer systems, the distributed computer system 200 is not so limited and may include any number of computer systems and computing devices, networked using any medium and communication protocol.

FIG. 2 illustrates a particular example of a distributed computer system 200 that includes computer system 202, 204 and 206. As illustrated in FIG. 2, the computer system 202 includes a processor 210, a memory 212, a bus 214, an interface 216 and data storage 218. To implement at least some of the aspects, functions and processes disclosed herein, the processor 210 performs a series of instructions that result in manipulated data. The processor 210 may be any type of processor, multiprocessor or controller. Some exemplary processors include commercially available processors such as an Intel Xeon, Itanium, Core, Celeron, Pentium, AMD Opteron, Sun UltraSPARC, IBM Power5+ and IBM mainframe chip. The processor 210 is connected to other system components, including one or more memory devices 212, by the bus 214.

The memory 212 stores programs and data during operation of the computer system 202. Thus, the memory 212 may be a relatively high performance, volatile, random access memory such as a dynamic random access memory (DRAM) or static memory (SRAM). However, the memory 212 may include any device for storing data, such as a disk drive or other non-volatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the bus 214. The bus 214 may include one or more physical busses, for example, busses between components that are integrated within a same machine, but may include any communication coupling between system elements including specialized or standard computing bus technologies such as IDE, SCSI, PCI and InfiniBand. Thus, the bus 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and communicate with external entities, such as users and other systems.

The data storage 218 includes a computer readable and writeable nonvolatile (non-transitory) data storage medium in which instructions are stored that define a program or other object that is executed by the processor 210. The data storage 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage 218. The memory may be located in the data storage 218 or in the memory 212, however, the processor 210 manipulates the data within the memory, and then copies the data to the storage medium associated with the data storage 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Root Cause Analysis Component

Figure 3:
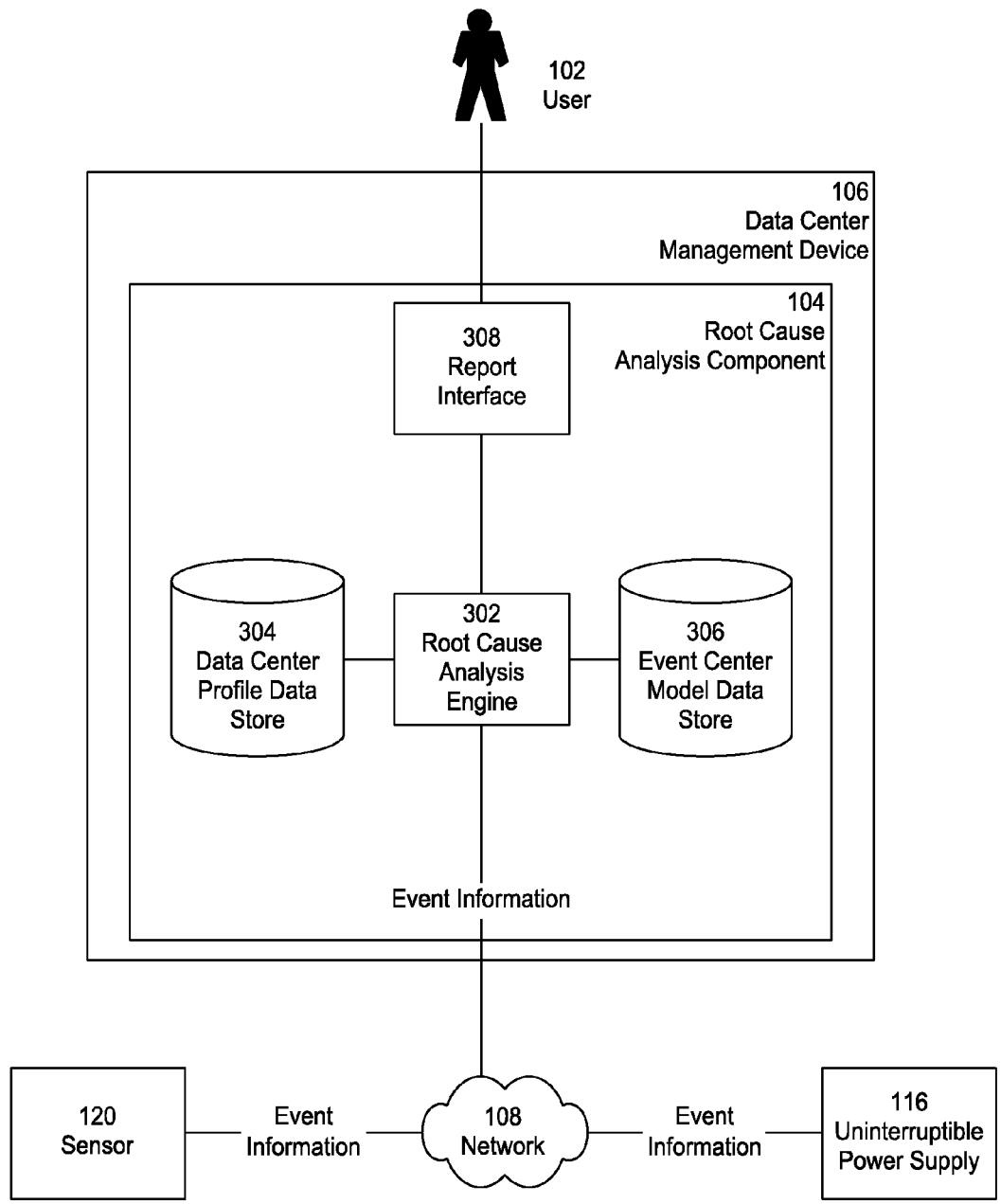
FIG. 3 is a functional schematic of a data center management device.

FIG. 3 provides a more detailed illustration of a particular physical and logical configuration of the data center management device 106 and the root cause analysis component 104. In this example, the root cause analysis component 104 includes a root cause analysis engine 302, a data center profile data store 304, an event cause model data store 306 and a report interface 308. The root cause analysis engine 302 implements a system interface through which the root cause analysis engine 302 exchanges event information with external physical infrastructure devices, such as the UPS 116 and the sensor device 120, via the network 108. Further, the root cause analysis engine 302 implements another system interface through which the root cause analysis engine provides the root cause analysis information to the report interface 308. The reporting interface 308, in turn, implements a reciprocal system interface to the root cause analysis engine 302 through which the reporting interface 308 exchanges root cause analysis information with the root cause analysis engine 302. The reporting interface 308 also provides a user interface through which the reporting interface 308 exchanges root cause analysis information with external entities, such as the user 102.

The event information exchanged by root cause analysis engine 302 and the physical infrastructure devices may include a description, a severity, an indicator of the device reporting the event (such as a device ID), a device type (such as UPS, PDU, Environmental, Cooling, Rack Access and the like) and various physical and logical attributes that are associated with the event. Physical attributes may include a physical location (such as a particular rack, row, room, building, etc.) of the device reporting the event. Logical attributes may include an identifier of a reporting device or membership of the reporting device in a logical group, such as an arbitrary, user-assigned device group, a network segment, power path group, cooling zone group, capacity group, device functional type or event category. Logical attributes may also include the content, or type, of the event, the time the event was reported or initiated, the time the event was resolved and the duration of time that the event was open. Examples of the event content include, among others, severity, temperature, humidity, dew-point, airflow information, contact sensor information, power information (such as amps, watts, voltage and VA), network connectivity information, device error or failure information, motion detection information, sound detection information and state information (door open/closed, camera motion detected, dry contact open/closed, etc).

As illustrated, the data center profile data store 304 includes components that store and retrieve data center profile information. In general, this data center profile information may include any information that describes characteristics or elements of a data center and the devices installed within the data center. Thus, data center profile information includes information defining the physical dimensions of the data center, data center resource capacities and redundancies. In addition, the data center profile information may include data specifying the location and identity of data center equipment, such as equipment racks and physical infrastructure devices within the data center. In some examples, the location of data center equipment and other devices supported by the data center, such as servers, routers and other information technology devices is specified with a high degree of precision. For instance, in one example, the building, room, row, rack, and U-height position of devices is specified within the data center profile data store 304. Data center profile information may also include data center device characteristics such as data center resource consumption and production information. This consumption and production information may include historical, empirical measurements of the data center resources produced or consumed by data center devices. The consumption and production information may also include production and consumption rate values based on theoretically modeled values (e.g. nameplate values) or based on stored, empirical historical measurements.

Continuing the example depicted in FIG. 3, the event cause model data store 306 includes components that store and retrieve event cause model information. In general, this event cause model information may include any information that specifies common, generic scenarios that often result in reporting of events. According to one example, event cause model information includes one or more event cause models that are associated with events that are commonly reported by data center devices. An event cause model relates events to data center resources and to devices that are involved in the provision of the data center resources. Thus, these event cause models include information that specifies data center resources, devices that are involved in the provision of data center resources, and a likelihood that the scenario specified by the event cause model actually occurred within a data center. In some examples, event cause models include recommended actions that may be taken to correct the cause or causes of an event.

Various examples include many discrete generic event cause models. For instance, one common event cause model that is associated with the cooling data center resource postulates that a shutdown event was generated by a server in response to an internal fan failure. Another common event cause model that is associated with the shutdown event specifies that the server shutdown in response to a UPS that supplies power to the server changing from online to battery power. Many other exemplary generic event cause models are defined within a variety of examples and, consequently, examples are not limited to a particular set of event cause models.

The data stores 306 and 308 may take the form of any logical construction capable of storing information on a computer readable medium including flat files, indexed files, hierarchical databases, relational databases or object oriented databases. In addition, links, pointers, indicators and other references to data may be stored in place, of or in addition to, actual copies of the data. The data may be modeled using unique and foreign key relationships and indexes. The unique and foreign key relationships and indexes may be established between the various fields and tables to ensure both data integrity and data interchange performance.

Furthermore, the structure and content of each of these various fields and tables depends on the type of data stored therein. Thus, in at least one example, the data structures and objects used to store the notification policy information differ from the data structures and objects used to store the consolidation policy information. Consequently, in this example, any process that accesses this data must be specially configured to account for the type of data accessed.

Continuing with the example illustrated in FIG. 3, the root cause analysis engine 302 generates root cause analysis information by referring to the data center profile data store 304 and the event cause model data store 306. This root cause analysis information includes data indicating one or more potential causes for the event, a likelihood that each potential cause is the actual root cause of the event within the data center described by the data center profile data store 304 and a recommended corrective action for each potential cause. As is explained further below, each potential cause may include a plurality of devices, including multiple physical infrastructure device and components thereof. One particular process for generating root cause information is illustrated below with reference to FIG. 4.

Figure 4:
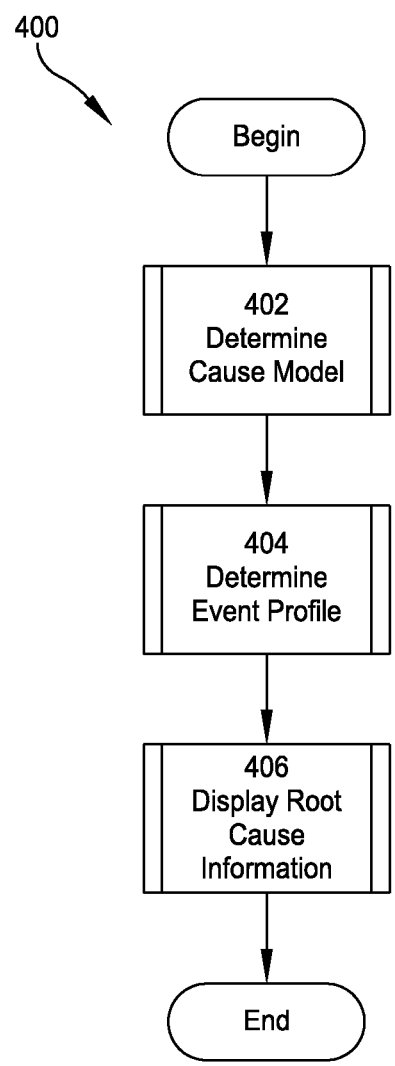
FIG. 4 is a flow chart of an example process for conducting a root cause analysis.

FIG. 4 illustrates a process 400 that includes acts of determining a cause model, adapting the cause model to generate an event profile and displaying root cause information. In act 402, a cause model fitting the event is determined. In at least one example, one or more potentially applicable event cause models are determined with reference to a data store that includes associations between events and generic cause models. Generic cause models describe situations in which events associated with the generic cause models are often reported. One example of a process performed in act 402 is discussed further below with reference to FIG. 5.

In act 404, an event profile is determined by adapting a cause model to a particular data center. In several examples, this adaption is performed with reference to a data store that contains a data center profile that describes characteristics of the particular data center to which one or more generic cause models are being adapted. One example of a process performed in act 404 is explained further below with reference to FIG. 6.

In act 406, root cause information is displayed. According to at least one example, the particular root cause information that is displayed varies based on reporting options that are selected by a user. One example of a process performed in act 406 is described further below with reference to FIG. 7. Root cause analysis processes in accord with the process 400 enable users to quickly determine desirable corrective actions to take in the face of many problematic data center situations.

Returning to the example of FIG. 3, the data center management device 106 implements the report interface 308 to exchange information, including report options and root cause analysis information with the user 102. In various examples, the report interface 308 employs a wide variety of technologies, user interface elements and interface metaphors to exchange information with external entities, such as the user 102. One particular example of a set of screens displayed by the report interface 308 is discussed further below with reference to FIGS. 8-12.

Each of the interfaces disclosed herein exchange information with various providers and consumers. These providers and consumers may include any external entity including, among other entities, users and systems. In addition, each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the system or unauthorized access to the system.

The system structure and content discussed below are for exemplary purposes only and are not intended to limit examples to the specific structure shown in FIG. 3. As will be apparent to one of ordinary skill in the art, many variant exemplary system structures can be architected. The particular arrangement presented in FIG. 3 was chosen to promote clarity.

Root Cause Analysis Reporting Interface

Figure 8:
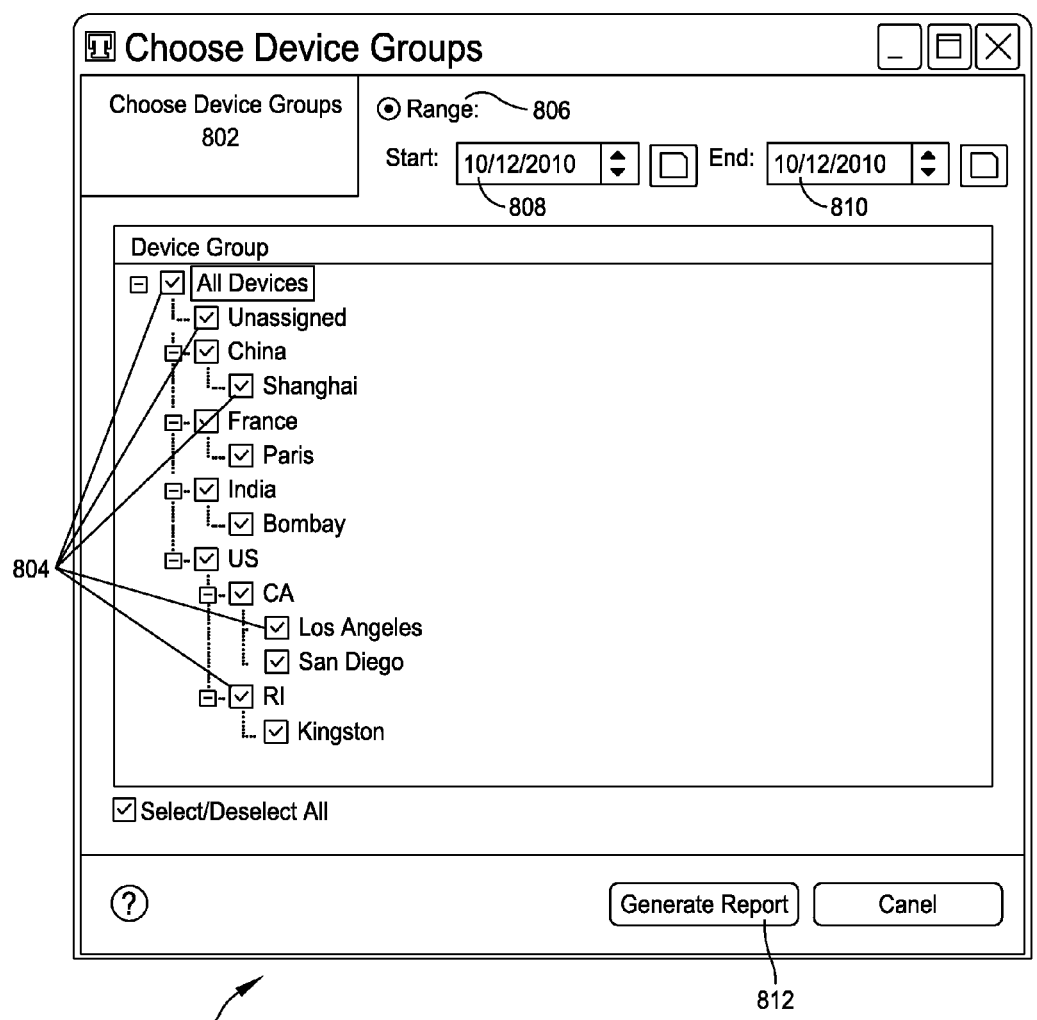
FIG. 8 is an exemplary user interface screen used to collect report options.

As discussed above, FIGS. 8-12 illustrate a set of user interface screens that are presented by the report interface 308 to exchange root cause analysis information with external entities, such as the user 102. FIG. 8 illustrates a user interface screen 800 that includes a device group explorer 802, group selection boxes 804, a date range selector 806, date selection components 808 and 810 and a generate report button 812. Together, these components enable the report interface 308 to receive a set of report options used to generate root causes analysis reports.

As shown, the device group explorer 802 presents a list of logical groups into which device are assigned. In this example, devices are assigned by groups that denote geographic location. However, in other examples, the device groups may be assigned according to any arbitrary classification scheme. Also as shown, the device group explorer 802 includes actionable group selection boxes 804 through which the report interface 308 receives indications of particular device groups selected for root cause analysis. The date range selector 806 includes date selection boxes 808 and 810 through which the report interface 308 receives indications of a particular time frame selected for root cause analysis. The report interface 308 also displays the generate report button 812, through which the report interface 308 receives indications to generate root cause analysis reports using the reporting options currently specified within the user interface screen 800.

Figure 9:
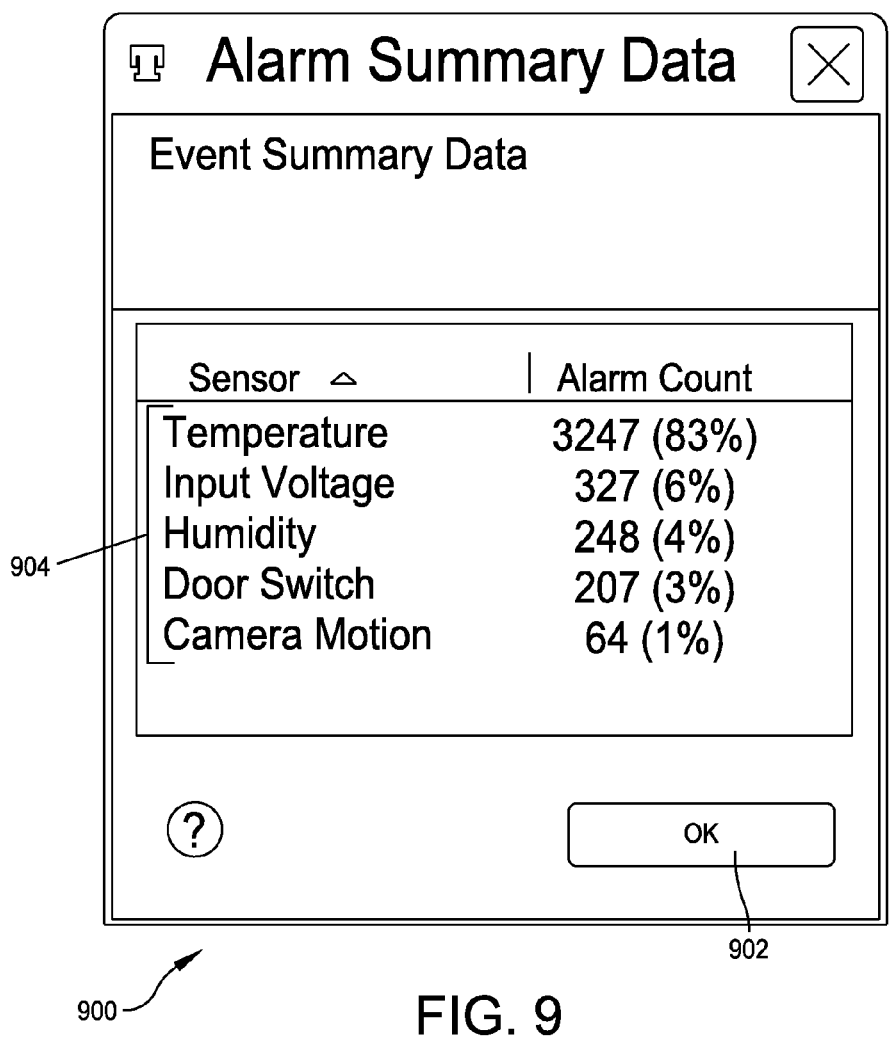
FIG. 9 is an exemplary user interface screen used to collect a selected sensor group.

According to some examples, the report interface 308 displays event summary information for events selected for root cause analysis in response to receiving an indication that the generate report button 812 was actuated. FIG. 9 illustrates an example user interface screen 900 that lists such event summary information. As shown, the user interface screen 900 includes an OK button 902 and sensor groups 904. Each sensor group within the sensor groups 904 lists the number (and percentage) of events received by the root cause analysis engine 302 for that group. In the example shown, temperature sensors reported the greatest number of events, followed by input voltage measuring devices, humidity sensors, door switches and camera motion detectors. In at least one example, each sensor group within the sensor groups 904 is selectable and the report interface 308 receives a selected sensor group from the user interface screen 900 upon actuation of the OK button 902.

Figure 10:
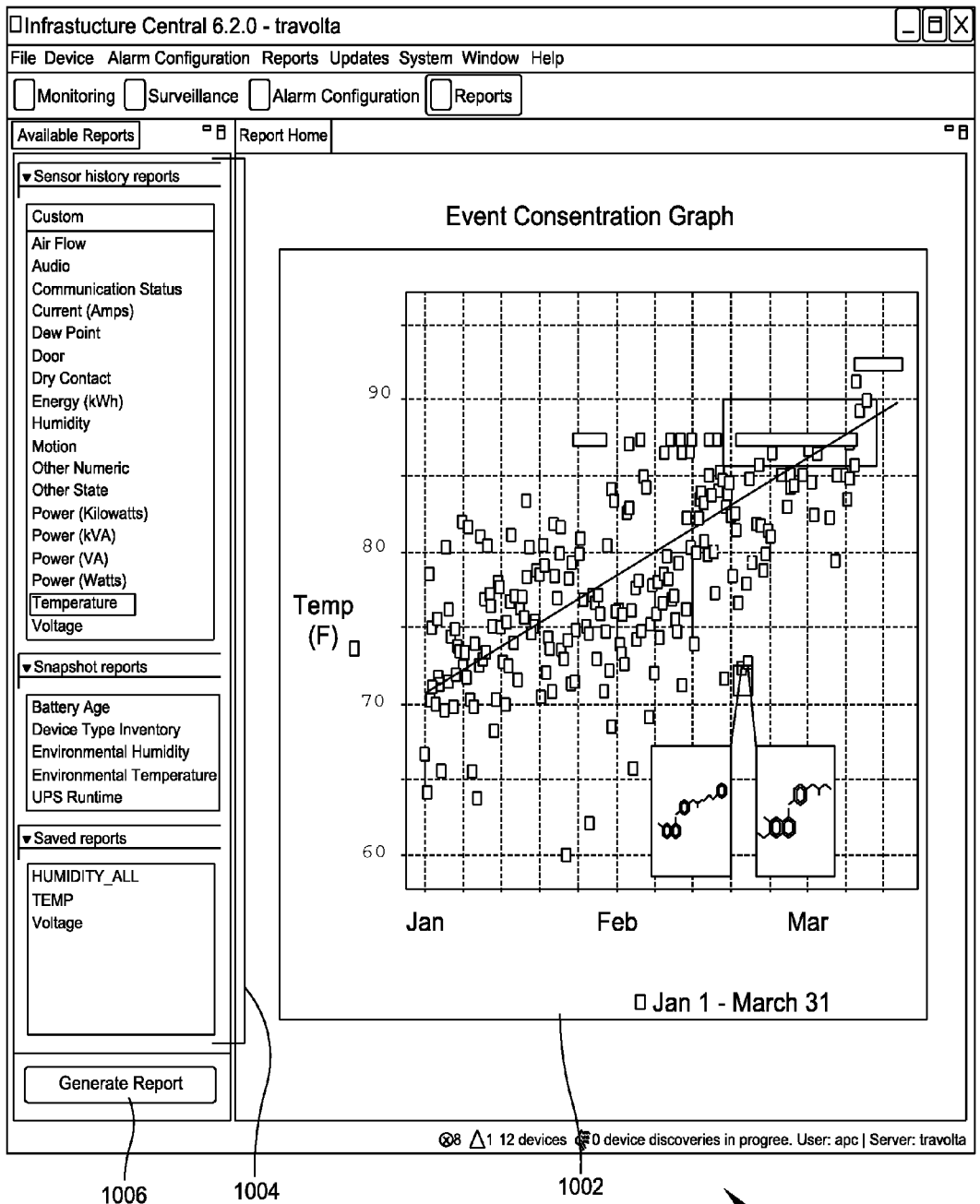
FIG. 10 is an exemplary user interface screen used to present an event concentration graph.

According to other examples, after receiving an actuation of the OK button 902, the report interface 308 displays a graphical representation of the events selected for root cause analysis. FIG. 10 illustrates one such display, a user interface screen 1000, that includes an event concentration graph 1002, report option selection areas 1004 and generate report button 1006. The event concentration graph 1002 displays a graphical representation of the event selected for root cause analysis. In the example shown, the event concentration graph 1002 plots temperature sensor events for the dates and device groups previously selected in user interface screen 800. The report option selection areas 1004 display a set of report options through which the report interface 308 receives new report options to use in generating another event concentration graph upon actuation of the generate report button 1006. Further, according to this example, the event concentration graph 1002 is selectable and upon selection of a subset of the events displayed via the event concentration graph 1002, the report interface 308 displays an event profile for the selected subset of events.

Figure 11:
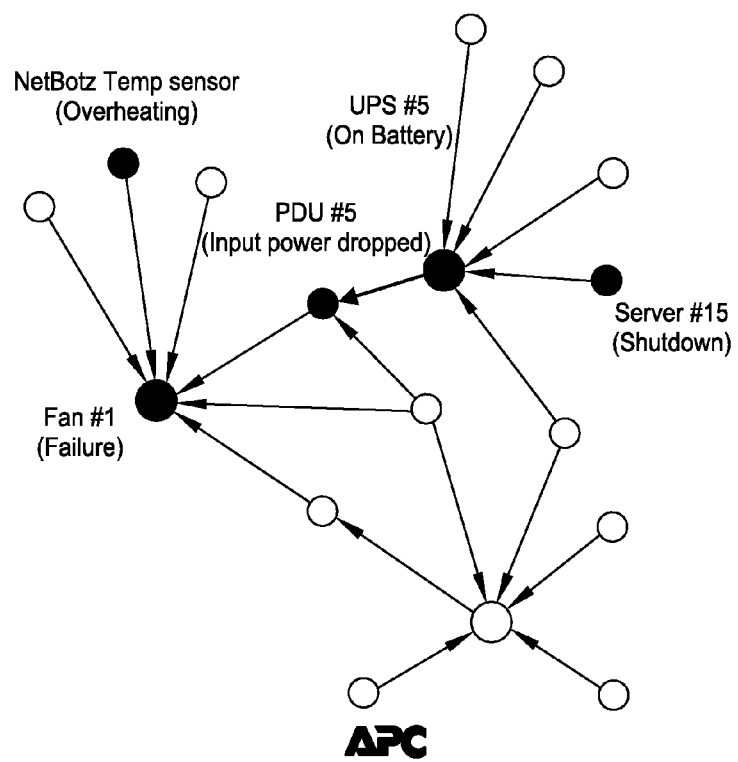
FIG. 11 is an exemplary user interface screen used to present an event profile.

FIG. 11 illustrates a graphical representation of an event profile. In this example, the report interface 308 displays nodes representing devices in the data center and directional links between the devices that represent causal relationships between events reported by the nodes. As shown, the events and reporting devices are: server #15 reported a shutdown, UPS #5 reported a shift to battery power, PDU #5 reported that input power dropped, a nearby temperature sensor reported overheating and Fan #1 reported a failure. As illustrated, the directional links lead to the potential root cause which in this case is Fan #1's failure. In other examples, the graphical representation of an event profile may include directional links that loop back to the device if, for example, a component within the device has caused the device to report an event. Moreover, directional links may indicate a probability that the event at the tail of the link caused the event at the head of the link.

Figure 12:
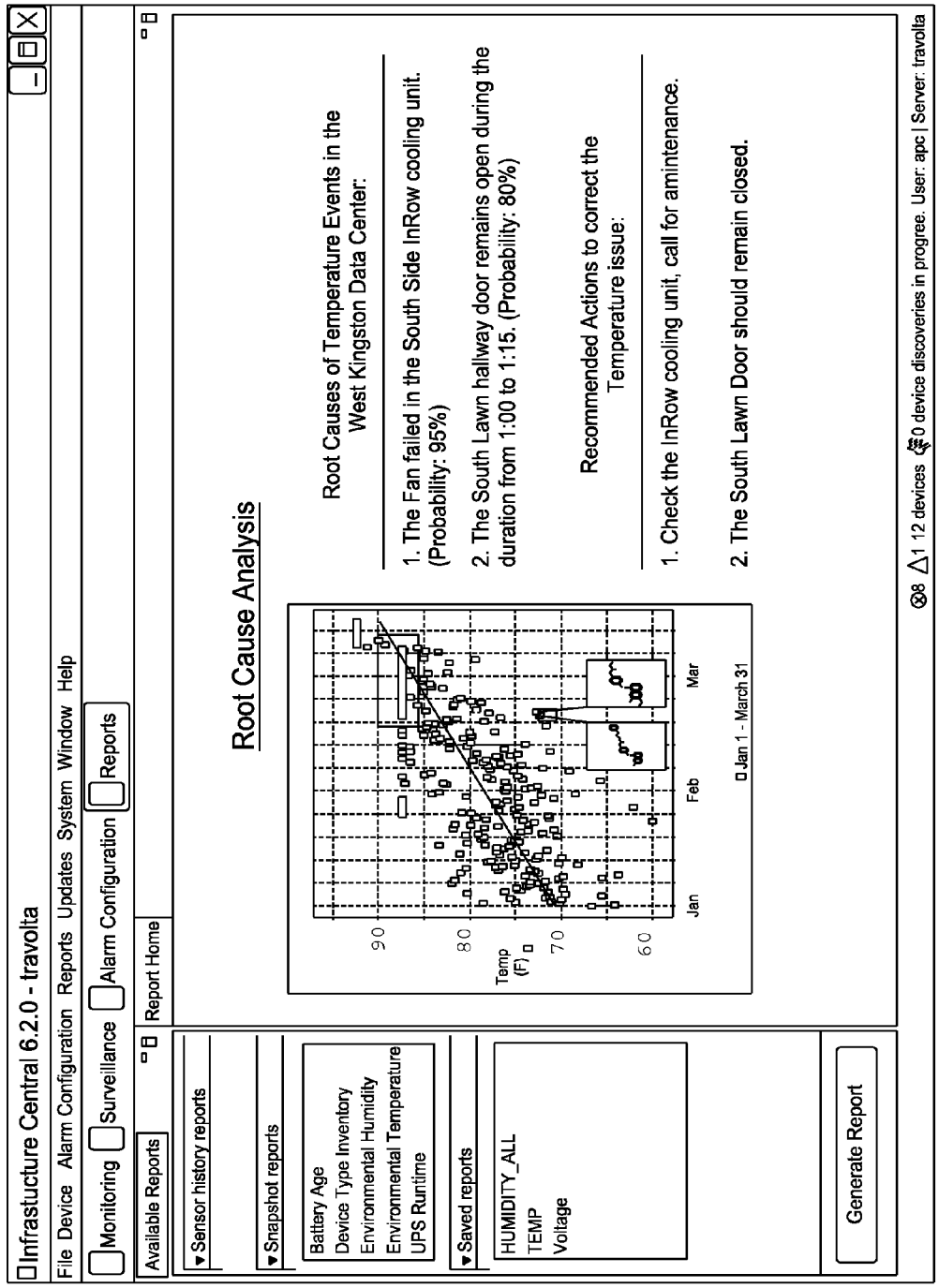
FIG. 12 is an exemplary user interface screen used to present root cause analysis information.

After displaying a representation of one event profile, the reporting interface 308 may display representations of other, alternative profiles based on the same, or different, events. Further, after displaying representations of event profiles. The report interface 308 displays a summary of the event profiles and lists recommended corrective actions. FIG. 12 illustrates an example of a screen used to display this sort of summary information.

Root Cause Analysis Processes

Figure 5:
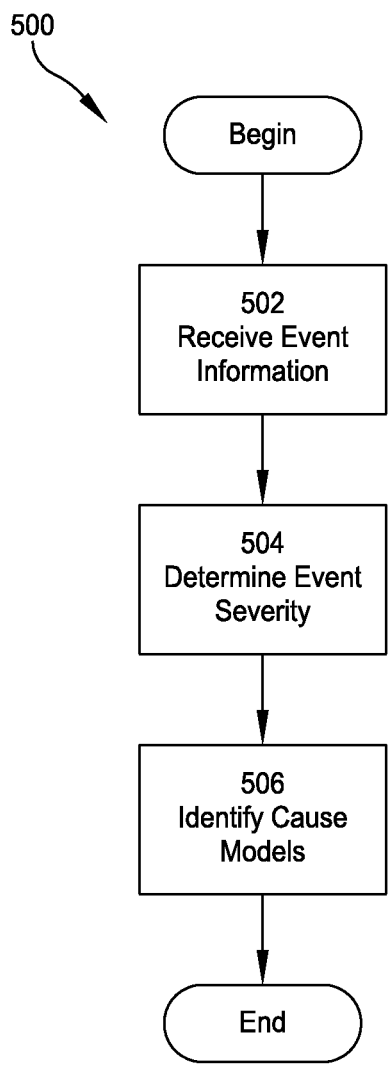
FIG. 5 is a flow chart of an example process for determining a generic cause model.

As discussed above with regard to act 402 shown in FIG. 4, various examples provide processes for determining a cause model. FIG. 5 illustrates one such process 500 that includes acts of receiving event information, determining event severity and identifying cause models. In act 502, a data center management device, such as the data center management device 106, receives event information via an interface between the data center management device and one or more physical infrastructure devices coupled to a network within a data center. In act 504, the data center management device analyzes the event information to determine if the event information warrants further analysis and, if so, stores the event information. In act 506, the data center management device identifies one or more generic cause models that may explain the root cause for the event. In at least one example, act 506 is performed by referencing an index that associates generic root cause models with events that are often reported by devices installed within a data center. Upon completion of the process 500, the data center management device has identified one or more generic cause models that may provide insight as to the root cause of one or more reported events.

Figure 6:
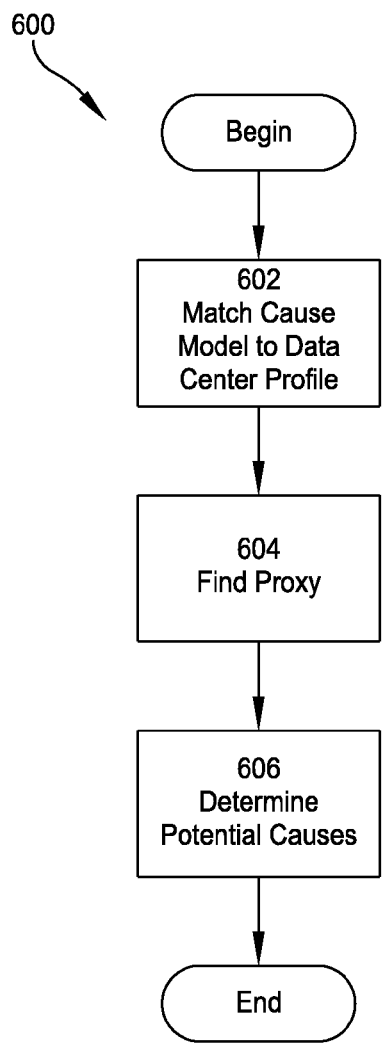
FIG. 6 is a flow chart of an example process for determining an event profile by adapting a generic cause model.

As discussed above with regard to act 404 shown in FIG. 4, various examples provide processes for determining an event profile. FIG. 6 illustrates one such process 600 that includes acts of identifying data center resources related to event cause models, determining devices within the data center that are involved in the provision of the identified data center resources and determining potential causes for the events.

In act 602, a data center management device attempts to overlay each generic cause model onto the data center profile of the data center in which the events are reported. For instance, according to one example, the root cause analysis engine 302 attempts to find a match, within the data center profile data store 304, for the functional arrangement of devices included in each generic event cause model. In one particular example, if the reported event is a server shutdown and the generic event cause model specifies that a UPS that supplies power to the server switched from online to battery power and that this switch caused the server to shutdown, the root cause analysis engine 302 searches the data center profile for failed UPS's that supply power to the server that reported the shutdown. For each match that is found, the functional arrangement of devices within the data center profile 304 is recorded within the event profile for event.

In another example, if no such match for the functional arrangement of devices is found, in act 604, the data center management device attempts to find a proxy for each functional arrangement within the data center profile data store 304. This proxy may include a set of devices involved in provision of the data center resource that is the focus of the generic event cause model. For instance, if the reported event is a server shutdown and the generic cause model specifies that an in-row cooling unit that supplies cooling to the server failed and that this failure caused the server to shutdown, the root cause analysis engine 302 searches the data center profile data store 304 for in-row cooling units that supply cooling to the server that reported the shutdown. If, according to the data center profile data store 304, no in-row cooling units supply cooling to the server, the root cause analysis engine 302 next searches for failure of CRAC units that supply cooling to the server. For each match that is found, the proxy is recorded within the event profile for event.

In act 606, the data center management device determines a probability that each potential cause specified within an event profile is the actual root cause. According to some examples, factors that weigh in the calculation of each probability include the probability for the generic event cause model as defined in the event cause model data store 306 and the structure and redundancy of devices involved in the provision of the data center resource that is the focus of the event profile. For instance, if the event profile postulates that a lack of power caused an event, but redundant power supplies are provided to the device reporting the event, the root cause analysis engine 302 decreases the probability that this potential cause is the actual root cause. In some examples, the root cause analysis interface 302 limits the list of potential causes to causes with a probability that falls above a predetermined threshold. Processes in accord with the process 600 allow a data center management device to determine one or more potential causes for reported events.

Figure 7:
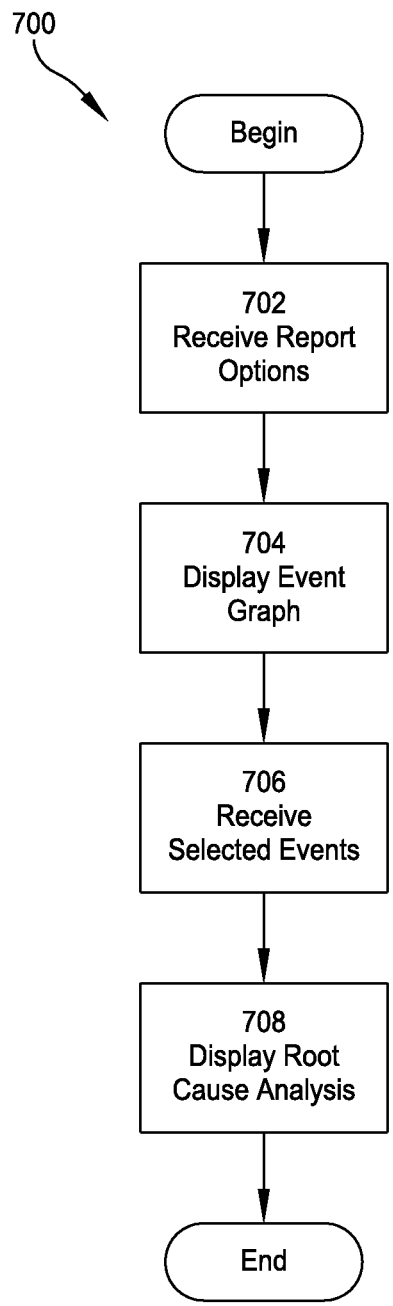
FIG. 7 is a flow chart of an example process for reporting root cause analysis information.

As discussed above with regard to act 406 shown in FIG. 4, various examples provide processes for displaying root cause information to external entities. FIG. 7 illustrates one such process 700 that includes acts of receiving report options, displaying an event graph, receiving selected events and displaying root cause analysis information. In act 702, a data center management device receives report options from an external entity, such as the user 102. These options narrow the population of reported events to be analyzed and may include one or more device groups and date ranges. One example of a user interface screen that is used to collect report options is discussed further below with reference to FIG. 8.

In act 704, a data center management device displays an event consolidation graph. One example of a user interface screen that is used to display an event consolidation graph is discussed further below with reference to FIG. 10. In act 706, the data center management device receives selected events via the event consolidation graph and in act 708, the data center management device displays root cause analysis information such as the information illustrated in FIGS. 11 and 12. Upon completion of the process 700, a data center management device has successfully conducted and provided the results of a root cause analysis for events reported within a data center.

Each of processes 400 through 700 depicts one particular sequence of acts in a particular example. The acts included in each of these processes may be performed by, or using, one or more data center management devices as discussed herein. Some acts are optional and, as such, may be omitted in accord with one or more examples. Additionally, the order of acts can be altered, or other acts can be added, without departing from the scope of the apparatus and methods discussed herein. In addition, as discussed above, in at least one example, the acts are performed on a particular, specially configured machine, namely a data center management device configured according to the examples disclosed herein.

Having now described some illustrative aspects, it should be apparent to those skilled in the art that the foregoing is merely illustrative and not limiting, having been presented by way of example only. Similarly, aspects may be used to achieve other objectives. For instance, in one example, instead of, or in addition to, reporting root cause analysis information, the data center management device may take corrective action based on the results of the root cause analysis. In another instance, examples are used to monitor physical infrastructure devices that reside outside of a data center, such as devices in wiring closets, point-of-sale terminals and server rooms. Further, some root cause analysis processes may determine potential causes for one or more events without the potential cause having been reported within an event. In these instances, the potential cause is inferred by other events that fit a generic event cause model as applied to a particular data center profile. Numerous modifications and other illustrative examples are within the scope of one of ordinary skill in the art and are contemplated as falling within the scope of the apparatus and methods disclosed herein. In particular, although many of the examples presented herein involve specific combinations of method acts or system elements, it should be understood that those acts and those elements may be combined in other ways to accomplish the same objectives.

What is claimed is:

1. A system for determining a root cause of an event in a data center including a plurality of devices, the system comprising:

a data center management device coupled to a network, the data center management device including a memory and at least one processor coupled to the memory, the data center management device being configured to:

receive an indication of the event from a physical infrastructure device via the network;

determine a first generic cause model for the event by accessing an index that associates generic cause models with events, wherein the first generic cause model includes an indication of a relationship between the event and provision of a first data center resource;

determine a first event profile by adapting the first generic cause model to the data center using data center profile information stored in a data center profile data store, wherein the data center management device is configured to adapt the first generic cause model to the data center at least in part by identifying a first device coupled to the physical infrastructure device that is involved in provision of the first data center resource;

display a first probability that a potential cause defined by the first event profile is the root cause;

determine a second generic cause model for the event by accessing the index, the second generic cause model including an indication of a relationship between the event and provision of a second data center resource;

determine a second event profile by adapting the second generic cause model to the data center using data center profile information stored in the data center profile data store, wherein the data center management device is configured to adapt the second cause model to the data center at least in part by identifying a second device coupled to the physical infrastructure device that is involved in provision of the second data resource; and display a second probability that another potential cause defined by the second event profile is the root cause.

2. The system according to claim 1, wherein the first data center resource is power.

3. The system according to claim 1, wherein the physical infrastructure device supplies the first data center resource to the first device.

4. The system according to claim 1, wherein the physical infrastructure device receives the first data center resource from the first device.

5. The system according to claim 1, wherein the first device is a component of the physical infrastructure device.

6. The system according to claim 1, wherein the data center management device is further configured to display at least one corrective action.

7. The system according to claim 6, wherein the data center management device is further configured to initiate the at least one correction action.

8. The system according to claim 1, wherein the first data center resource and the second data center resource are a same data center resource.

9. The system according to claim 1, wherein the second device is coupled to the physical infrastructure device via the first device.

10. The system according to claim 9, wherein the data center management device is further configured to:

display the first probability as a first link between two or more first nodes in a graph, each of the first nodes representing either the physical infrastructure device or another device of the plurality of devices; and display the second probability as a second link between two or more second nodes in a graph, each of the second nodes representing either the physical infrastructure device or another device of the plurality of devices.

11. The system according to claim 10, wherein the data center management device is further configured to:

determine that the first probability is greater than the second probability; and highlight the one or more first nodes responsive to determining that the first probability is greater than the second probability.

12. A method for determining a root cause of an event in a data center using a data center management device coupled to a network, the data center management device including memory and at least one processor coupled to the memory, the method comprising:

receiving indication of the event from a physical infrastructure device via the network;

determining a first generic cause model for the event by accessing an index that associates generic cause models with events, wherein the first generic cause model indicates a relationship between the event and provision of a first data center resource;

determining a first event profile by adapting the first generic cause model to the data center using data center profile information stored in a data center profile data store, wherein adapting the first generic cause model to the data center includes identifying a first device coupled to the physical infrastructure device that is involved in provision of the first data center resource;

displaying a first probability that a potential cause defined by the first event profile is the root cause;

determining a second generic cause model for the event by accessing the index, the second generic cause model indicating a relationship between the event and provision of a second data center resource;

determining a second event profile by adapting the second generic cause model to the data center using data center profile information stored in the data center profile data store, wherein adapting the second cause model to the data center includes identifying a second device coupled to the physical infrastructure device that is involved in provision of the second data resource; and displaying a second probability that another potential cause defined by the second event profile is the root cause.

13. The method according to claim 12, wherein receiving the event includes receiving an event related to the provision of power.

14. The method according to claim 12, further comprising:

displaying the first probability as a first link between two or more first nodes in a graph, each of the first nodes representing either the physical infrastructure device or another device of a plurality of devices included in the data center; and displaying the second probability as a second link between two or more second nodes in a graph, each of the second nodes representing either the physical infrastructure device or another device of the plurality of devices.

15. A non-transitory computer readable medium having stored thereon sequences of instruction for determining a root cause of an event in a data center including instructions that will cause at least one processor to:

receive an indication of the event from a physical infrastructure device via the network;

determine a first generic cause model for the event by accessing an index that associates generic cause models with events, wherein the first generic cause model includes an indication of a relationship between the event and provision of a first data center resource;

determine a first event profile by adapting the first generic cause model to the data center using data center profile information stored in a data center profile data store, wherein the instructions to determine the first event profile will further cause the at least one processor to adapt the first generic cause model to the data center at least in part by identifying a first device coupled to the physical infrastructure device that is involved in provision of the first data center resource;

display a first probability that a potential cause defined by the first event profile is the root cause determine a second generic cause model for the event by accessing the index, the second generic cause model including an indication of a relationship between the event and provision of a second data center resource;

determine a second event profile by adapting the second generic cause model to the data center using data center profile information stored in the data center profile data store, wherein the instructions to determine the second event profile will further cause the at least one processor to adapt the second cause model to the data center at least in part by identifying a second device coupled to the physical infrastructure device that is involved in provision of the second data resource; and display a second probability that another potential cause defined by the second event profile is the root cause.

16. The non-transitory computer readable medium according to claim 15, wherein the sequences of instruction include instructions that will further cause the at least one processor to display the first probability as first link between two or more first nodes in a graph, each of the first nodes representing either the physical infrastructure device or another device of a plurality of devices included in the data center.

* * * * *